United States Patent
Kumakura et al.

(10) Patent No.: US 11,941,313 B2
(45) Date of Patent: Mar. 26, 2024

(54) WORKING MACHINE CONTROL DEVICE, WORKING MACHINE, AND WORKING MACHINE CONTROL METHOD FOR PERFORMING SCREEN CONTROL BASED ON IDENTIFIED POSITION

(71) Applicant: Komatsu Ltd., Tokyo (JP)

(72) Inventors: Yoshito Kumakura, Tokyo (JP); Takayuki Nishihata, Tokyo (JP); Daiki Arimatsu, Tokyo (JP); Kentaro Takayama, Tokyo (JP); Ryohei Hasegawa, Tokyo (JP); Junki Irie, Tokyo (JP)

(73) Assignee: Komatsu Ltd., Tokyo (JP)

(*) Notice: Subject to any disclaimer, the term of this patent is extended or adjusted under 35 U.S.C. 154(b) by 303 days.

(21) Appl. No.: 17/417,202

(22) PCT Filed: Jan. 17, 2020

(86) PCT No.: PCT/JP2020/001576
§ 371 (c)(1),
(2) Date: Jun. 22, 2021

(87) PCT Pub. No.: WO2020/149409
PCT Pub. Date: Jul. 23, 2020

(65) Prior Publication Data
US 2022/0075584 A1 Mar. 10, 2022

(30) Foreign Application Priority Data
Jan. 18, 2019 (JP) .................. 2019-007383

(51) Int. Cl.
*G06F 3/14* (2006.01)
*E02F 9/26* (2006.01)
(Continued)

(52) U.S. Cl.
CPC .................. *G06F 3/14* (2013.01); *E02F 9/26* (2013.01); *G06F 3/0482* (2013.01); *G06T 7/70* (2017.01); *G06V 20/00* (2022.01)

(58) Field of Classification Search
CPC ........... G06F 3/14; G06F 3/0482; G06T 7/70; G06V 20/00; E02F 9/26
See application file for complete search history.

(56) References Cited

U.S. PATENT DOCUMENTS

2003/0001750 A1* 1/2003 Ishimoto ................. G06F 3/048
340/425.5
2004/0210370 A1 10/2004 Gudat et al.
(Continued)

FOREIGN PATENT DOCUMENTS

EP 3521517 8/2019
JP 11134160 A 5/1999
(Continued)

*Primary Examiner* — Terrell M Robinson
(74) *Attorney, Agent, or Firm* — Fish & Richardson P.C.

(57) ABSTRACT

A control device for a working machine includes a position designation receiving unit configured to identify a designated position in a state image which is displayed on a display panel and a screen control unit configured to perform screen control based on an image displayed at the identified position out of part images constituting parts of the state image.

10 Claims, 13 Drawing Sheets

(51) Int. Cl.
*G06F 3/0482* (2013.01)
*G06T 7/70* (2017.01)
*G06V 20/00* (2022.01)

(56) References Cited

U.S. PATENT DOCUMENTS

| | | | |
|---|---|---|---|
| 2005/0273230 A1 | 12/2005 | Steinmeier et al. | |
| 2014/0288771 A1* | 9/2014 | Li | E02F 9/205 |
| | | | 701/34.4 |
| 2016/0237654 A1 | 8/2016 | Arimatsu et al. | |
| 2016/0251836 A1 | 9/2016 | Baba et al. | |
| 2016/0305094 A1* | 10/2016 | Chang | E02F 9/264 |
| 2018/0044893 A1* | 2/2018 | Machida | G01S 13/04 |
| 2018/0266082 A1 | 9/2018 | Tanishige et al. | |
| 2019/0218753 A1 | 7/2019 | Morimoto | |
| 2020/0126464 A1* | 4/2020 | Onishi | G09G 3/20 |

FOREIGN PATENT DOCUMENTS

| | | | |
|---|---|---|---|
| JP | A-2002-173956 | | 6/2002 |
| JP | 2002275949 A | | 9/2002 |
| JP | 2002285585 A | | 10/2002 |
| JP | A-2008-266976 | | 11/2008 |
| JP | 2009283014 A | | 12/2009 |
| JP | 2011127372 A | * | 6/2011 |
| JP | A-2011-127372 | | 6/2011 |
| JP | A-2011-231489 | | 11/2011 |
| JP | A-2012-173855 | | 9/2012 |
| JP | 2012233404 A | | 11/2012 |
| JP | 2013097519 A | * | 5/2013 |
| JP | A-2013-097519 | | 5/2013 |
| JP | A-2013-115514 | | 6/2013 |
| JP | 2014222795 A | * | 11/2014 |
| JP | A-2014-222795 | | 11/2014 |
| JP | B-5893144 | | 3/2016 |
| JP | B-6189557 | | 8/2017 |
| JP | 2017178300 A | | 10/2017 |
| JP | A-2018-009370 | | 1/2018 |
| JP | 2019001460 A | * | 1/2019 |
| JP | A-2019-001460 | | 1/2019 |
| JP | 2019103105 A | | 6/2019 |
| WO | WO 2015/173935 | | 11/2015 |
| WO | 2018062363 A1 | | 4/2018 |
| WO | WO 2018/062374 | | 4/2018 |

* cited by examiner

WORKING MACHINE CONTROL DEVICE, WORKING MACHINE, AND WORKING MACHINE CONTROL METHOD FOR PERFORMING SCREEN CONTROL BASED ON IDENTIFIED POSITION

CROSS-REFERENCE TO RELATED APPLICATIONS

This application is a National Stage application under 35 U.S.C. § 371 of International Application No. PCT/JP2020/001576, filed on Jan. 17, 2020, which claims priority to Japanese Patent Application No. 2019-007383, filed on Jan. 18, 2019. The contents of the prior applications are incorporated herein in their entirety.

TECHNICAL FIELD

The present invention relates to a control device for a working machine, a working machine, and a control method for a working machine.

BACKGROUND ART

Patent Literature 1 discloses a working machine including a detachable attachment. Examples of the attachment include a bucket and a breaker. The working machine determines whether the attachment includes a sensor on the basis of information on the attachment including information on an attachment with a sensor and information on an attachment without a sensor. When it is determined that the attachment includes a sensor and a signal from the sensor cannot be received, it is determined that an abnormality has occurred.

CITATION LIST

Patent Literature

Patent Literature 1
  Japanese Patent No. 6189557

SUMMARY OF INVENTION

Technical Problem

For example, when an attachment of a working machine is exchanged, an operator needs to change settings of a control device which is mounted in the working machine. At this time, the operator changes the settings by operating a monitor device which is mounted in a cab. For example, as described in Patent Literature 1, the operator needs to perform a plurality of screen transitions such as "Bucket Configuration"→"Bucket Exchange" when the settings are changed with exchange of the attachment.

Even when an operator intends to change settings with exchange of an attachment by operating the monitor device at the time of exchange of the attachment, an operation based on an operation lever or pedal may not be stopped depending on work conditions. Since the setting changing operation takes time, work efficiency also decreases. Accordingly, there is demand for a system that does not require a plurality of screen transitions and can simply change settings.

An objective of the invention is to provide a control device for a working machine, a working machine, and a control method for a working machine in which settings can be changed with a simple operation.

Solution to Problem

According to an aspect of the invention, there is provided a control device for a working machine, including a position designation receiving unit configured to identify a designated position in a state image which is displayed on a display panel and a screen control unit configured to perform screen control based on an image displayed at the identified position out of part images constituting parts of the state image.

Advantageous Effects of Invention

According to the aforementioned aspect, it is possible to change settings with a simple operation.

DESCRIPTION OF EMBODIMENTS

Figure 1:
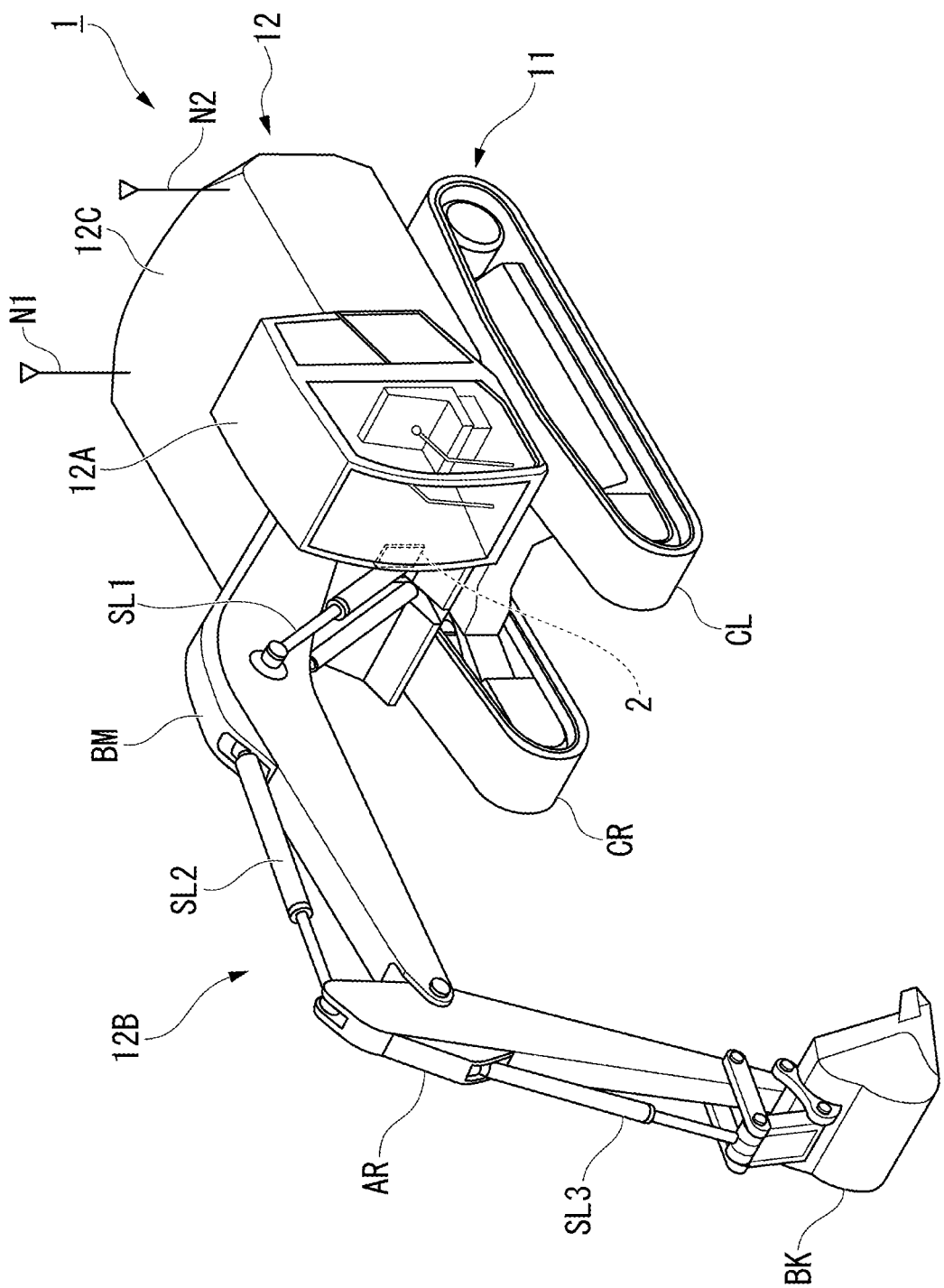
FIG. 1 is a diagram illustrating a whole configuration of a working machine according to a first embodiment.

<First Embodiment>
Hereinafter, a control device for a working machine according to a first embodiment will be described in detail with reference to FIGS. 1 to 11.
(Structure of Working Machine)
FIG. 1 is a diagram illustrating a structure of a working machine according to a first embodiment.
A working machine 1 that is a hydraulic excavator excavates and levels earth at a work site or the like.
As illustrated in FIG. 1, the working machine 1 that is a hydraulic excavator includes an undercarriage 11 for traveling and an upper swing body 12 that is provided on the undercarriage 11 and is able to swing. The upper swing body 12 is provided with a cab 12A, work equipment 12B, and two GNSS antennas N1 and N2.

The undercarriage 11 includes a left crawler CL and a right crawler CR. The working machine 1 moves forward, swings, and moves rearward with rotation of the left crawler CL and the right crawler CR.

The cab 12A is a place where an operator of the working machine 1 enters and performs operations and manipulations. The cab 12A is provided on a left side of a front end of the upper swing body 12. A control device 2 is mounted in the cab 12A of the working machine 1.

The work equipment 12B includes a boom BM, an arm AR, and a bucket BK. The boom BM is attached to a front end of the upper swing body 12. The arm AR is attached to the boom BM. The bucket BK is attached to the arm AR. A boom cylinder SL1 is attached between the upper swing body 12 and the boom BM. The boom BM can move relative to the upper swing body 12 by driving the boom cylinder SL1. An arm cylinder SL2 is attached between the boom BM and the arm AR. The arm AR can move relative to the boom BM by driving the arm cylinder SL2. A bucket cylinder SL3 is attached between the arm AR and the bucket BK. The bucket BK can move relative to the arm AR by driving the bucket cylinder SL3.

The upper swing body 12, the boom BM, the arm AR, and the bucket BK which are provided in the working machine 1 that is a hydraulic excavator are examples of moving parts of the working machine 1.

The working machine 1 according to this embodiment includes the aforementioned configuration, but the working machine 1 may not include the whole configuration in another embodiment. For example, a working machine 1 according to another embodiment may not include the GNSS antennas N1 and N2.

(Configuration of Cab)

Figure 2:
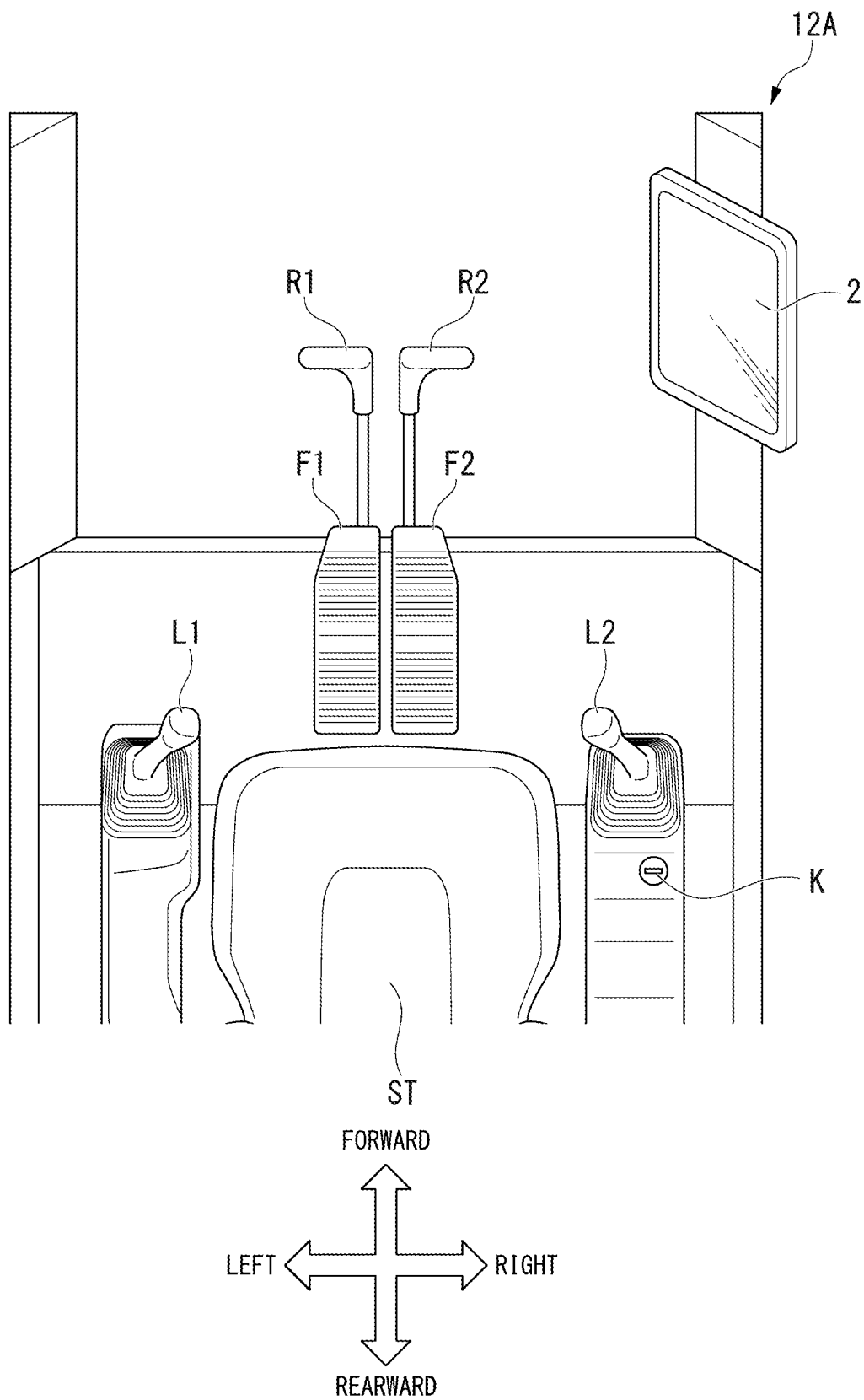
FIG. 2 is a diagram illustrating a configuration of a cab of the working machine according to the first embodiment.

FIG. 2 is a diagram illustrating a configuration of the cab of the working machine according to the first embodiment.

As illustrated in FIG. 2, operation levers L1 and L2, foot pedals F1 and F2, and traveling levers R1 and R2 are provided in the cab 12A.

The operation lever L1 and the operation lever L2 are disposed on the left and right sides of a seat ST in the cab 12A. The foot pedal F1 and the foot pedal F2 are disposed on the floor in front of the seat ST in the cab 12A.

The operation lever L1 disposed on the left side when facing toward the front of the cab is an operation mechanism that performs a swing operation of the upper swing body 12 and an excavating/dumping operation of the arm AR. The operation lever L2 disposed on the right side when facing toward the front of the cab is an operation mechanism that performs an excavating/dumping operation of the bucket BK and a raising/lowering operation of the boom BM.

The traveling levers R1 and R2 are operation mechanisms that perform operation control of the undercarriage 11, that is, travel control of the working machine 1. The traveling lever R1 disposed on the left side when facing toward the front of the cab corresponds to rotational driving of the left crawler CL of the undercarriage 11. The traveling lever R2 disposed on the right side when facing toward the front of the cab corresponds to rotational driving of the right crawler CR of the undercarriage 11. The foot pedals F1 and F2 operate in cooperation with the traveling levers R1 and R2 and traveling control may be performed using the foot pedals F1 and F2.

The control device 2 is provided on the front-right side when facing toward the front of the cab. Functions of the control device 2 will be described below in detail. In another embodiment, the control device 2 may be provided on the front-left side when facing toward the front of the cab or the like.

(Functional Configuration of Control Device)

Figure 3:
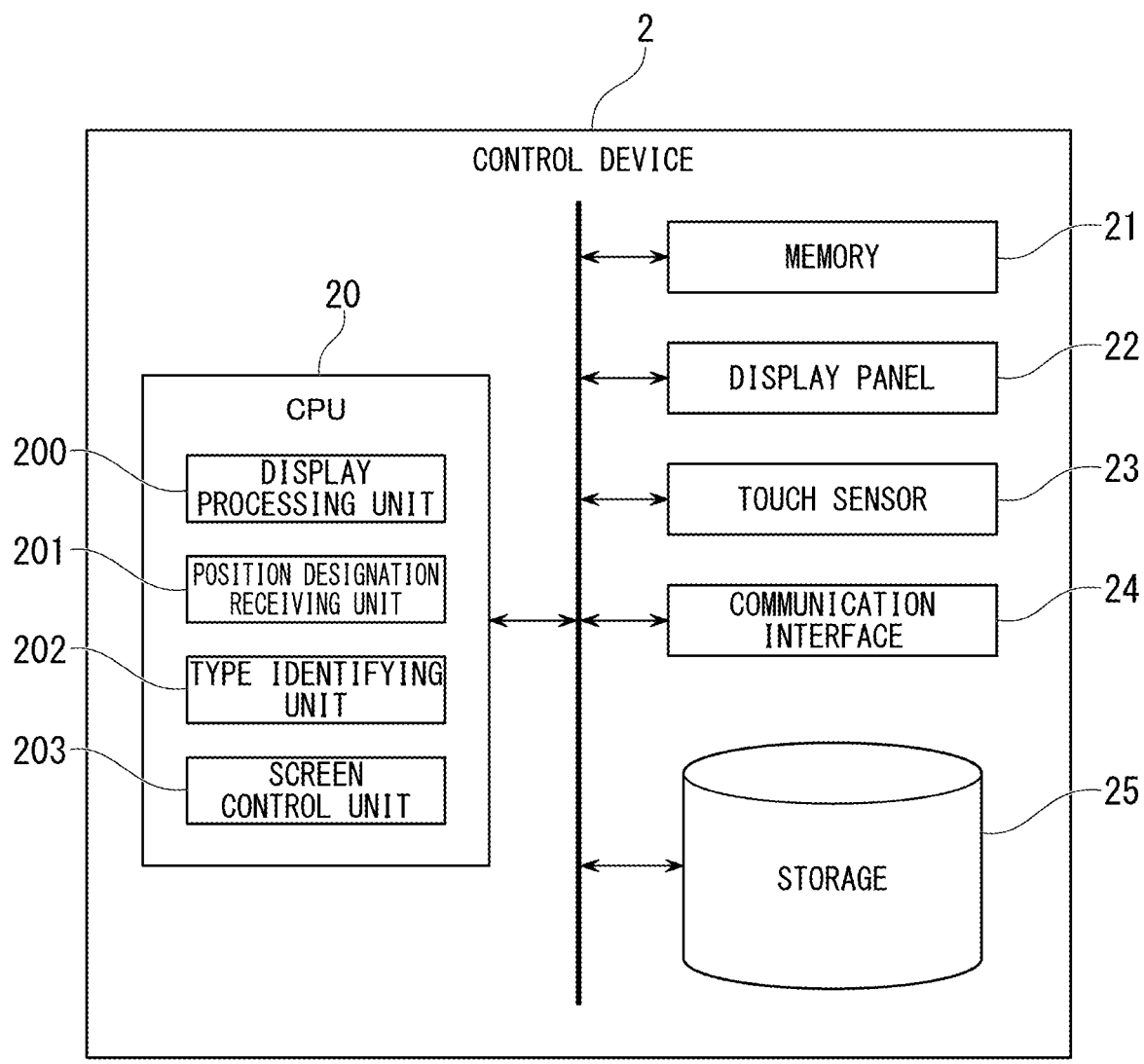
FIG. 3 is a diagram illustrating a functional configuration of a control device for the working machine according to the first embodiment.

FIG. 3 is a diagram illustrating a functional configuration of the control device 2 according to the first embodiment.

As illustrated in FIG. 3, the control device 2 includes a CPU 20, a memory 21, a display panel 22, a touch sensor 23, a communication interface 24, and a storage 25. The CPU 20 is not particularly limited as long as it is an FPGA, a GPU, or an element similar thereto.

The CPU 20 is a processor that takes charge of control of the whole operation of the control device 2. Various functions of the CPU 20 will be described later.

The memory 21 is a so-called main storage device. Commands and data required for CPU 20 to operate in accordance with a program are loaded in the memory 21.

The display panel 22 is a display device that can visibly display information and is, for example, a liquid crystal display or an organic EL display.

The touch sensor 23 is an input device that is formed integrally with the display panel 22 and can designate a position in an image which is displayed on the display panel 22.

In another embodiment, the input device is not limited to a touch sensor and may be an input device other than the touch sensor.

The communication interface 24 is a communication interface that communicates with an external server.

The storage 25 is a so-called auxiliary storage device and is, for example, a hard disk drive (HDD) or a solid state drive (SSD).

The functions of the CPU 20 will be described below in detail. The CPU 20 functions as a display processing unit 200, a position designation receiving unit 201, a type identifying unit 202, and a screen control unit 203 by operating in accordance with a predetermined program.

The predetermined program may realize some of the functions which are performed by the control device 2. For example, the program may realize the functions in combination with another program stored in advance in the storage 25 or in combination with another program mounted in another device. In another embodiment, the control device 2 may include a customized large scale integrated circuit (LSI) such as a programmable logic device (PLD) in addition to or instead of the aforementioned configuration. Examples of the PLD include a programmable array logic (PAL), a generic array logic (GAL), a complex programmable logic device (CPLD), and a field programmable gate array (FPGA). In this case, some or all of the functions which are performed by the processor may be realized by the integrated circuit.

The display processing unit 200 generates a signal for displaying a state image indicating a state of the working machine 1 on the display panel 22. The display panel 22 displays the state image on the basis of the signal generated by the display processing unit 200. The state image indicating a state of the working machine 1 is, for example, an image indicating an operating state of a moving part of the work equipment 12B or a positional relationship between the working machine 1 and a nearby landform. The state image is sequentially updated and changed with a change of the state of the working machine 1. An operator of the working machine 1 performs operation and manipulation of the working machine 1 while viewing the state image displayed on the display panel 22.

The position designation receiving unit 201 receives designation of a position in the state image displayed on the display panel 22. In this embodiment, the position designation receiving unit 201 acquires a touch position on the display panel 22 using the touch sensor 23.

In another embodiment, when a mouse is provided instead of the touch sensor 23, the position designation receiving unit 201 acquires a position of a mouse cursor when a click operation is performed.

The type identifying unit 202 identifies a type of a part image which is displayed at a position designated by an operator through a touch out of part images constituting parts of the state image. The part images constituting the state image and the types thereof will be described later. A touch is, for example, a tapping operation of tapping a point on the display panel 22.

The screen control unit 203 performs control of the part image displayed at the designated position. The screen control unit 203 performs screen control based on the type identified by the type identifying unit 202. Here, screen control is not limited to a process of actually reflecting change of settings, and includes a process of displaying various menu screens such as an attachment selection menu image M1 which will be described later in the course of changing settings.

The control device 2 according to the first embodiment is integrated with the display panel 22, but another embodiment may not employ this configuration. A control device 2 according to another embodiment may have a configuration in which the display panel 22 is provided separately from other constituents. That is, the display panel 22 is not essential to the control device 2.

(Flow of Processes of Control Device)

Figure 4:
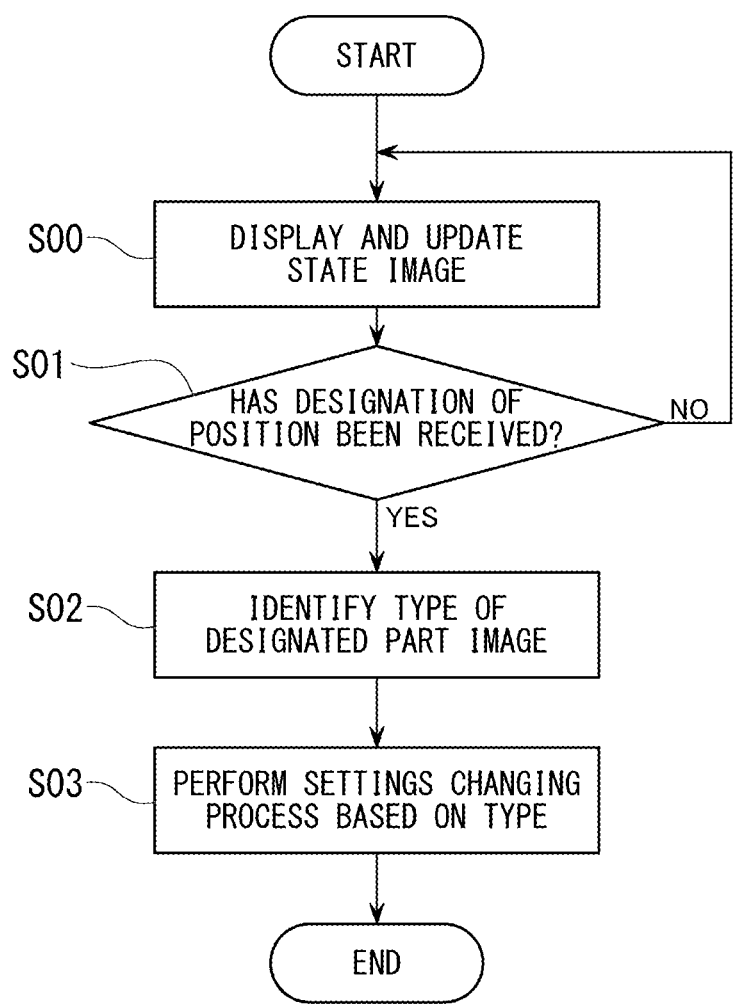
FIG. 4 is a diagram illustrating a flow of processes which are performed by the control device for the working machine according to the first embodiment.

FIG. 4 is a diagram illustrating a flow of processes which are performed by the control device according to the first embodiment.

Figure 5:
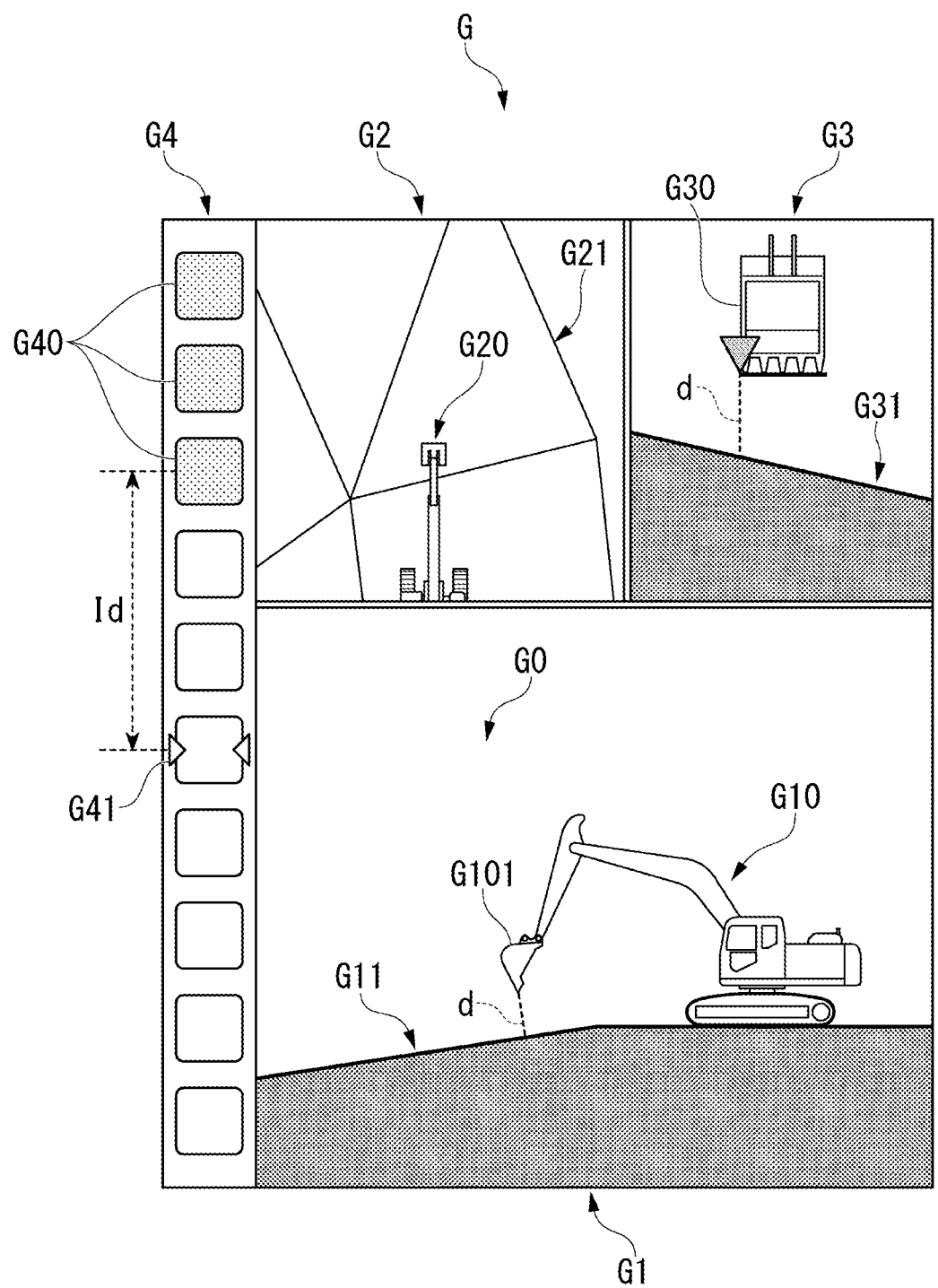
FIG. 5 is a diagram illustrating an example of a state image according to the first embodiment.

FIG. 5 is a diagram illustrating an example of a state image according to the first embodiment.

A flow of specific processes which are performed by the control device 2 will be described below in detail with reference to FIGS. 4 and 5.

The flow of processes illustrated in FIG. 4 is performed when power of the control device 2 is turned on by an operator. The control device 2 may be automatically started with power-on of the working machine 1 as a trigger.

The display processing unit 200 of the CPU 20 generates a signal for sequentially performing the processes of displaying and updating a state image (Step S00). The state image which is displayed and updated on the basis of the signal generated by the display processing unit 200 will be described below in detail with reference to FIG. 5.

As illustrated in FIG. 5, the state image G includes a side view image G1, an overhead view image G2, a bucket front view image G3, and a guidance image G4.

The side view image G1, the overhead view image G2, and the bucket front view image G3 will be described in detail first.

The side view image G1, the overhead view image G2, and the bucket front view image G3 are images indicating current operating states of moving parts of the working machine 1 such as postures of the boom BM, the arm AR, and the bucket BK and positional relationships with a nearby landform and illustrate states from different points of view.

The side view image G1 is a side view image of the working machine 1 and the nearby landform and includes a working machine model image G10 indicating the operating state of the working machine 1 in a side view and a landform image G11 indicating a longitudinal section of the nearby landform of the working machine 1.

The overhead view image G2 is an overhead image of the working machine 1 and the nearby landform and includes a working machine model image G20 indicating the operating state of the working machine 1 in an overhead view and a landform image G21 indicating an overhead view of the nearby landform of the working machine 1.

The bucket front view image G3 is a front view image of the bucket BK and the nearby landform and includes a working machine model image G30 indicating the operating state of the bucket BK in a front view and a landform image G31 indicating a cross section of the nearby landform of the bucket BK. Here, the nearby landform may be a design surface or an existing landform.

The working machine model images G10 and G20 include a combination of element images reproducing positions and postures of the boom BM, the arm AR, and the bucket BK of the working machine 1. For example, an attachment image G101 included in the working machine model image G10 of the side view image G1 is an element image reproducing the position and the posture of the bucket BK.

Here, the CPU 20 of the control device 2 calculates the operating states of the moving parts of the working machine 1, that is, an angle of the boom BM with respect to the upper swing body 12, an angle of the arm AR with respect to the boom BM, and an angle of the bucket BK with respect to the arm AR, using sensors attached to the cylinders SL1, SL2, and SL3 or an angle sensor such as an IMU. The position designation receiving unit 201 applies the results of calculation of the operating states of the moving parts to the element images of the working machine model images G10, G20, and G30. Accordingly, the shapes of the working machine model images G10, G20, and G30 change in conjunction with actual operations of the moving parts of the working machine 1.

Landform data which is acquired as three-dimensional data is stored in advance in the storage 25 of the control device 2. The CPU 20 displays the landform images G11, G21, and G31 on the basis of the landform data and positioning information of the working machine 1 based on the GPS antennas G1 and G2.

Shapes, connection positions, sizes, and the like of the moving parts of the working machine 1 are stored in advance in the storage 25. The shapes, the connection positions, the sizes, and the like of the moving parts of the working machine 1 are also referred to as specification information in the following description. The CPU 20 calculates a distance d from teeth of the bucket BK to the design surface in combination of the specification information of the working machine 1 with the results of calculation of the operating states of the moving parts and the landform data. In another embodiment, the distance d may be a distance from a portion other than the teeth of the bucket BK to the design surface.

The screen configuration of the state image G is not limited to the configuration illustrated in FIG. 5 and the state image can be displayed in various screen configurations. For example, the state image G illustrated in FIG. 5 has the configuration in which one screen is divided into three regions including the side view image G1, the overhead view image G2, and the bucket front view image G3. In another embodiment, the screen may be divided into two regions including the side view image G1 and the overhead view image G2. The screen may include only one of the side view image G1, the overhead view image G2, and the bucket front view image G3. The screen division mode and the type of the displayed screen may be freely customized by an operator.

A background image G0 is shared by the side view image G1, the overhead view image G2, and the bucket front view image G3.

The guidance image G4 will be described below in detail.

The guidance image G4 is an example of an image indicating a positional relationship between the working machine 1 and the nearby landform and is specifically a diagram schematically illustrating the distance between the teeth of the bucket BK and the ground surface.

As illustrated in FIG. 5, the guidance image G4 includes a plurality of index images G40 that are arranged in the vertical direction of the state image G. The index images G40 are displayed in a colored or colorless manner and the lowest index image G40 out of the index images G40 displayed in the colored manner corresponds to the tooth position of the bucket BK.

The index image G40 with a reference position image G41 corresponds to a design surface. In the state image G, the index images G40 above the index image G40 with the reference position image G41 correspond to positions higher than the design surface. The index images G40 below the index image G40 with the reference position image G41 correspond to positions lower than the design surface.

A distance Id between the lowest one of the index images G40 displayed in the colored manner and the index image G40 with the reference position image G41 corresponds to the distance between the teeth of the bucket BK and the design surface. That is, the index images G40 displayed in the colored manner are determined on the basis of the result of calculation of the distance d.

When the teeth of the bucket BK is located below the design surface, the index images G40 below the index image G40 with the reference position image G41 are displayed in the colored manner.

The color of the index images G40 displayed in the colored manner varies depending on the distance between the teeth of the bucket BK and the design surface.

As described above, the guidance image G4 according to this embodiment is provided for allowing an operator to visually recognize the positional relationship between the teeth of the bucket BK and the design surface using the index images G40 as described above. In another embodiment, the guidance image G4 is not limited to this example. A guidance image G4 according to another embodiment may be a front facing compass for informing whether a specific surface represented by the design surface and the work equipment 12B face each other frontally.

Referring back to FIG. 4, the position designation receiving unit 201 of the CPU 20 determines whether a touch from an operator, that is, designation of a position in the state image, has been received (Step S01). When a touch from an operator has not been received (Step S01: NO), the CPU 20 causes the flow of processes to return to Step S00 and updates the state image G in consideration of the operating state of the working machine 1. On the other hand, when a touch from an operator has been received (Step S01: YES), the position designation receiving unit 201 identifies the touched position in the state image displayed on the display panel 22.

Then, the type identifying unit 202 of the CPU 20 identifies the type of a part image which is displayed at the touched position (Step S02). Here, a part image is an image constituting a part of the state image G displayed on the display panel and examples thereof include the working machine model image G10, the guidance image G4, and the background image G0 in this embodiment. The working machine model image G10 includes a plurality of part images which are further subdivided and an example of a part image constituting the working machine model image is an attachment image G101. A display position or a display range of a part image varies with change of the state of the working machine 1. For example, a display position of the working machine model image G10 or the attachment image G101 changes according to an operation of the working machine 1. In the guidance image G4, a color of an image which is displayed in the index image G40 changes according to the positional relationship between the teeth of the bucket BK and the design surface. The type identifying unit 20 performs specific processes as follows. First, when a touched position is identified by the position designation receiving unit 201, the type identifying unit 20 acquires coordinate information (X, Y) indicating the position from the position designation receiving unit 201. The type identifying unit 20 acquires what part image is disposed at what position or region on the state image G at the time point at which the coordinate information (X, Y) has been acquired. The type identifying unit 20 identifies which of the working machine model image G10, the guidance image G4, . . . the part image displayed at the acquired coordinate information (X, Y) is. In this way, the type identifying unit 20 identifies the type of the part image displayed on the state image G at the current time point at the touched position.

Then, the screen control unit 203 performs control according to the type identified in Step S02 (Step S03).

(Function of Screen Control Unit)

FIGS. 6 to 11 are diagrams illustrating the function of the screen control unit according to the first embodiment.

The processes of Steps S01 to S03 which are performed by the screen control unit 203 will be described below in detail with reference to FIGS. 6 to 11.

Attachment Image

Figure 6:
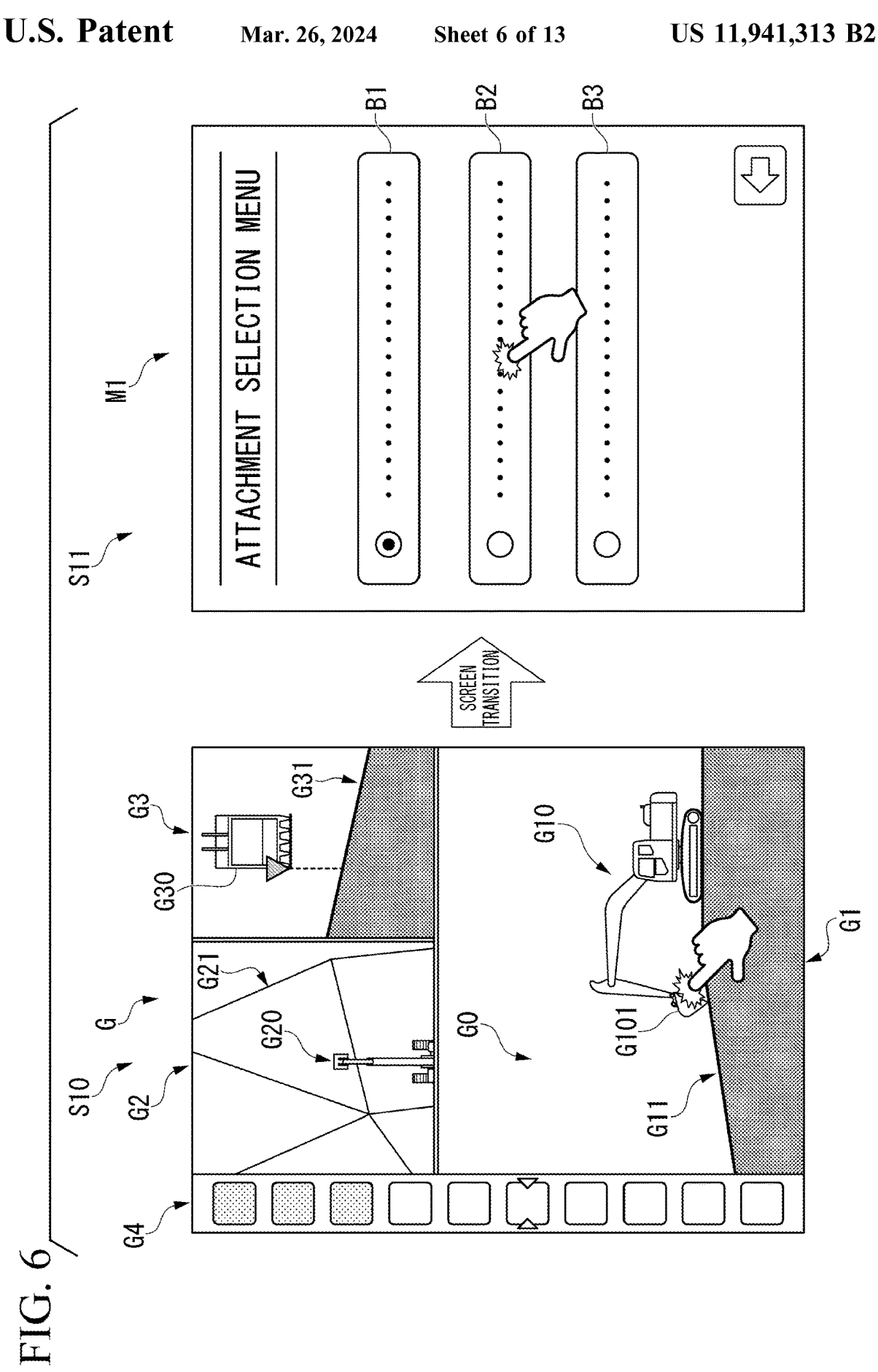
FIG. 6 is a diagram illustrating a function of a screen control unit according to the first embodiment.
Figure 7:
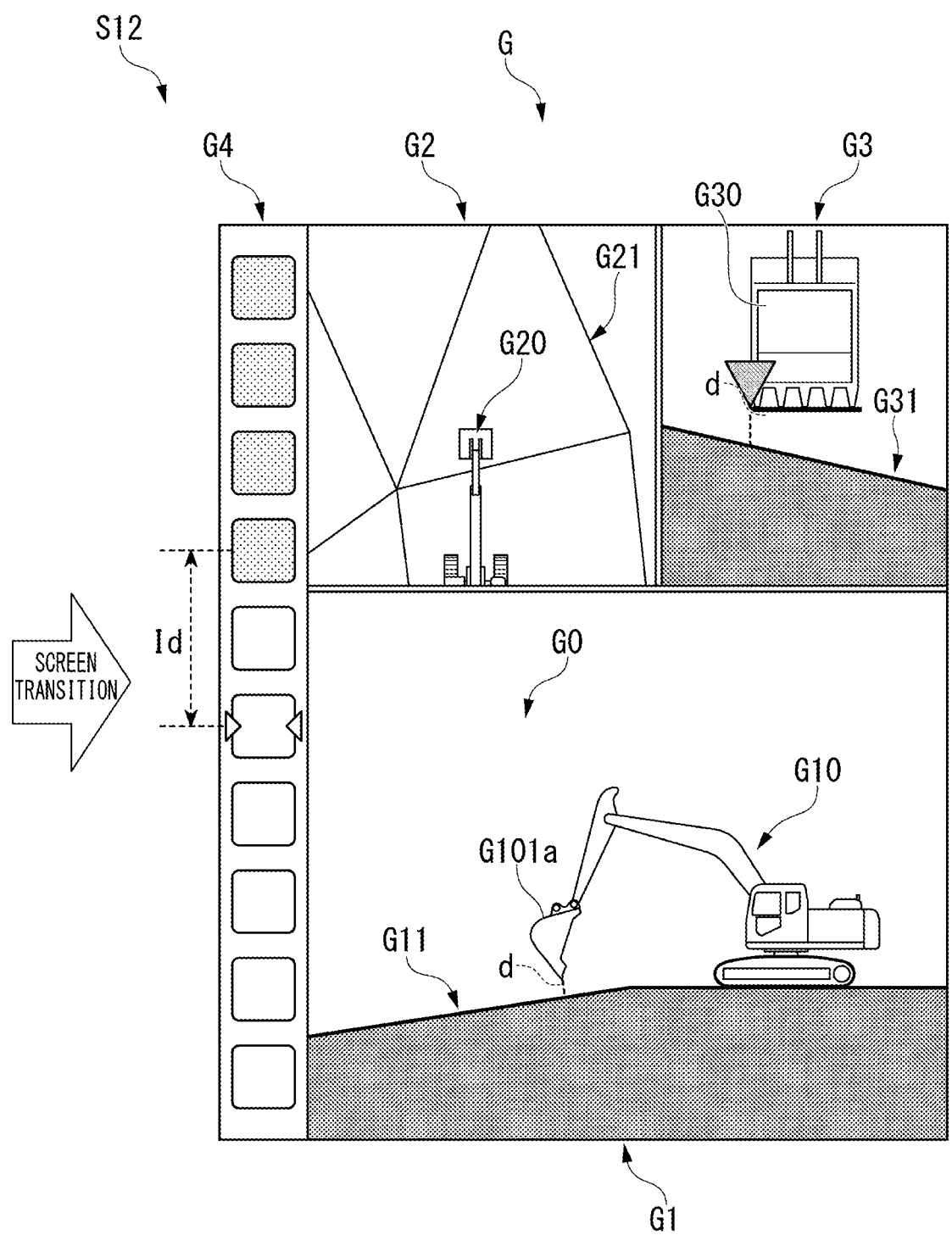
FIG. 7 is a diagram illustrating a function of the screen control unit according to the first embodiment.

FIGS. 6 and 7 are diagrams illustrating screen control when a type of a part image is an attachment image G101.

First, it is assumed that the state image G is displayed on the display panel 22 (Step S10 in FIG. 6).

In this state, it is assumed that an operator has touched the attachment image G101 in the working machine model image G10 included in the side view image G1. In this case, the screen control unit 203 causes an image which is displayed on the display panel 22 to transition from the stage image G to an attachment selection menu image M1 (Step S11 in FIG. 6). Specifically, the attachment image G101 and a screen of a transition destination are linked and the screen control unit 203 causes the attachment image G101 to transition to the linked attachment selection menu image M1 when the attachment image G101 is identified by the type identifying unit 202.

Selection button images B1, B2, and B3 corresponding to a plurality of attachments are displayed in the attachment selection menu image M1. Here, the selection button image B1 corresponds to, for example, a current bucket, the selection button image B2 corresponds to, for example, a bucket A, and the selection button image B3 corresponds to, for example, a breaker.

Then, the operator selects one corresponding to a post-exchange attachment out of the selection button images B1 to B3 displayed in the attachment selection menu image M1 by a touch. Then, the screen control unit 203 causes an image displayed on the display panel 22 to transition from the attachment selection menu image M1 to the state image G (Step S12 in FIG. 7).

As illustrated in FIG. 7, settings of the post-exchange attachment are reflected in the state image G displayed in Step S12. Accordingly, an attachment image G101a indicating the position and posture of the post-exchange attachment is displayed in the state image G illustrated in FIG. 7. FIG. 7 illustrates an example in which the bucket BK before the screen control is exchanged with a larger bucket. The CPU 20 re-calculates the distance d between the teeth of the attachment and the design surface and the distance Id on the basis of the specification information on the post-exchange bucket.

As described above, when the type of the touched part image is the attachment image G101, the screen control unit 203 performs a process of changing the currently displayed attachment image to a selected other attachment image.

In Step S10 in FIG. 6, the screen control unit 203 may also perform the same process when a touch on an attachment image included in the overhead view image G2 or the bucket front view image G3 is received.

In another embodiment, when an operator touches an attachment image G101 included in the state image G, the screen control unit 203 may directly change the attachment image G101 of the state image G without transitioning to the attachment selection menu image M1. In this case, the screen control unit 203 may change the attachment image G101 sequentially to another attachment image whenever a touch is received.

In another embodiment, even when an area which is out of the attachment image G101 and which is in a predetermined range from a display area of the attachment image G101 is touched, the screen control unit 203 may perform the same process as when a touch on the attachment image G101 has been received.

In another embodiment, the screen control unit 203 may cause the current screen to transition to a screen in which dimension information of an attachment is displayed when a touch on the attachment image G101 included in the side view image G1 has been received. The current screen may transition to a screen in which a maximum loading capacity of the attachment is displayed.

In another embodiment, when a touch on the attachment image G101 has been received, the screen control unit 203 may cause the current screen to transition to a screen in which images of a plurality of buckets which are candidates for exchange are displayed and receive a touch on one image thereof.

Guidance Image

Figure 8:
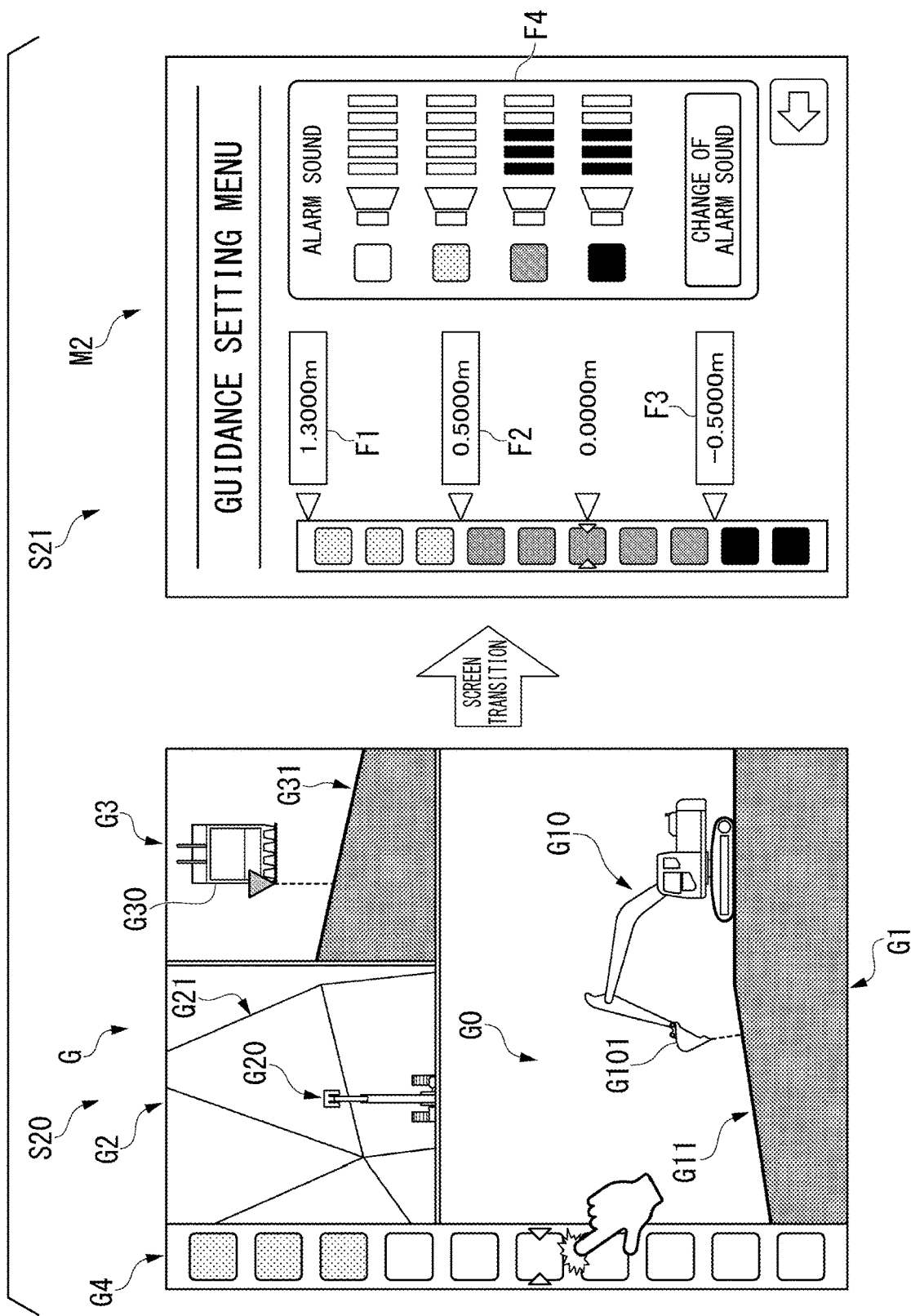
FIG. 8 is a diagram illustrating a function of the screen control unit according to the first embodiment.

FIG. 8 is a diagram illustrating screen control when the type of a part image is the guidance image G4.

First, it is assumed that the state image G is displayed on the display panel G22 (Step S20 in FIG. 8).

In this state, it is assumed that an operator has touched the guidance image G4. In this case, the screen control unit 203 causes the image displayed on the display panel 22 to transition from the state image G to a guidance setting menu image M2 (Step S21 in FIG. 8). Specifically, the guidance image G4 and a screen which is a transition destination are linked, and when the guidance image G4 is identified by the type identifying unit 202, the screen control unit 203 causes the current image to transition to the guidance setting menu image M2 which is a link destination of the guidance image G4. In the guidance setting menu image M2, settings of the correspondence between the distance Id between the index images G40 and the distance d between the teeth of the bucket BK and the design surface can be changed using input forms F1 to F3. In the guidance setting menu image M2, settings of a sound volume, a sound type, and the like of alarm sound can be changed using a setting change menu F4 for alarm sound.

As described above, when the type of the touched part image is the guidance image G4, the screen control unit 203 changes display settings of the positional relationship between the teeth of the bucket BK and the design surface using the guidance image G4.

Accordingly, an operator can simply and intuitively change display settings of the guidance image G4.

In another embodiment, when values to be input in the guidance setting menu image M2 are predetermined, the screen control unit 203 may change settings associated with the guidance image G4 directly to the predetermined values without transitioning to the guidance setting menu image M2 at the time of a touch on the guidance image G4.

In another embodiment, even when an area which is out of the guidance image G4 and which is in a predetermined range from a display area of the guidance image G4 is touched, the screen control unit 203 may perform the same process as when a touch on the guidance image G4 has been received.

Working Machine Model Image 1

Figure 9:
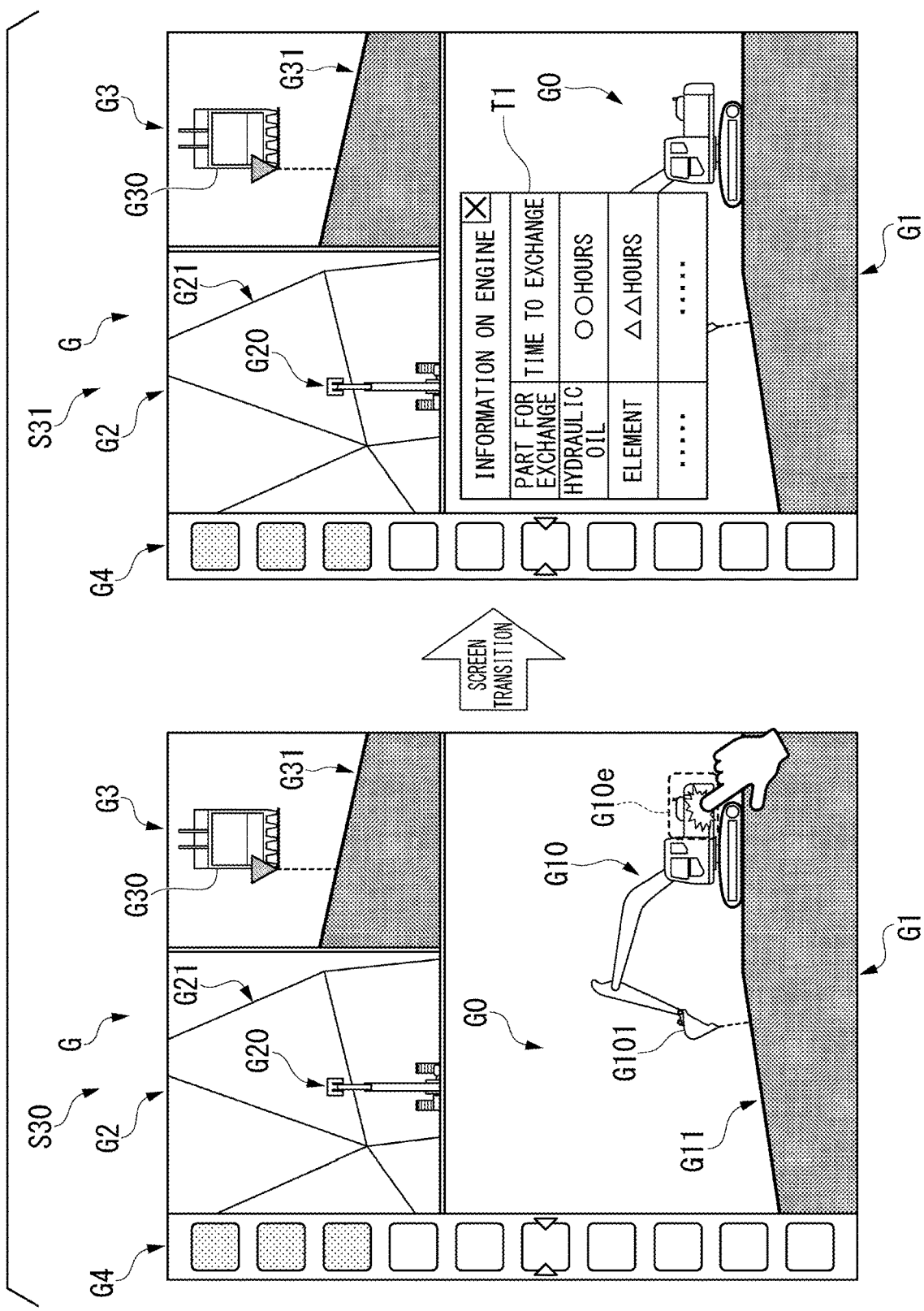
FIG. 9 is a diagram illustrating a function of the screen control unit according to the first embodiment.

FIG. 9 is a first diagram illustrating the screen control when the type of a part image is the working machine model image G10 (G20, G30).

First, it is assumed that a state image G is displayed on the display panel 22 (Step S30 in FIG. 9).

In this state, it is assumed that an operator has touched an area G10e corresponding to a place at which an engine is mounted in the working machine model image G10 included in the side view image G1. In this case, the screen control unit 203 displays an information table T1 indicating various types of information of the engine in the state image G (Step S31 in FIG. 9).

When the operator touches a part image corresponding to a place at which a constituent part other than the engine of the working machine 10 in the working machine model image G10 included in the side view image G1, the screen control unit 203 displays an information table indicating various types of information on the constituent part.

As described above, when the type of the touched part image is the working machine model image G10 (G20, F30), the screen control unit 203 changes whether to display information on a constituent part corresponding to the touched position in the working machine model image G10 (G20, G30).

Accordingly, the operator can ascertain various types of information on a constituent part such as an engine with a simple and intuitive operation.

When the area G10e is included in the overhead view image G2 or the bucket front view image G3, the screen control unit 203 may also perform the same process at the time of receiving a touch on the area G10e included in the overhead view image G2 or the bucket front view image G3 in Step S30 in FIG. 9.

In another embodiment, even when an area which is out of the area G10e and which is in a predetermined range from a display area of the area G10e is touched, the screen control unit 203 may perform the same process as when a touch on the area G10e has been received.

Working Machine Model Image 2

Figure 10:
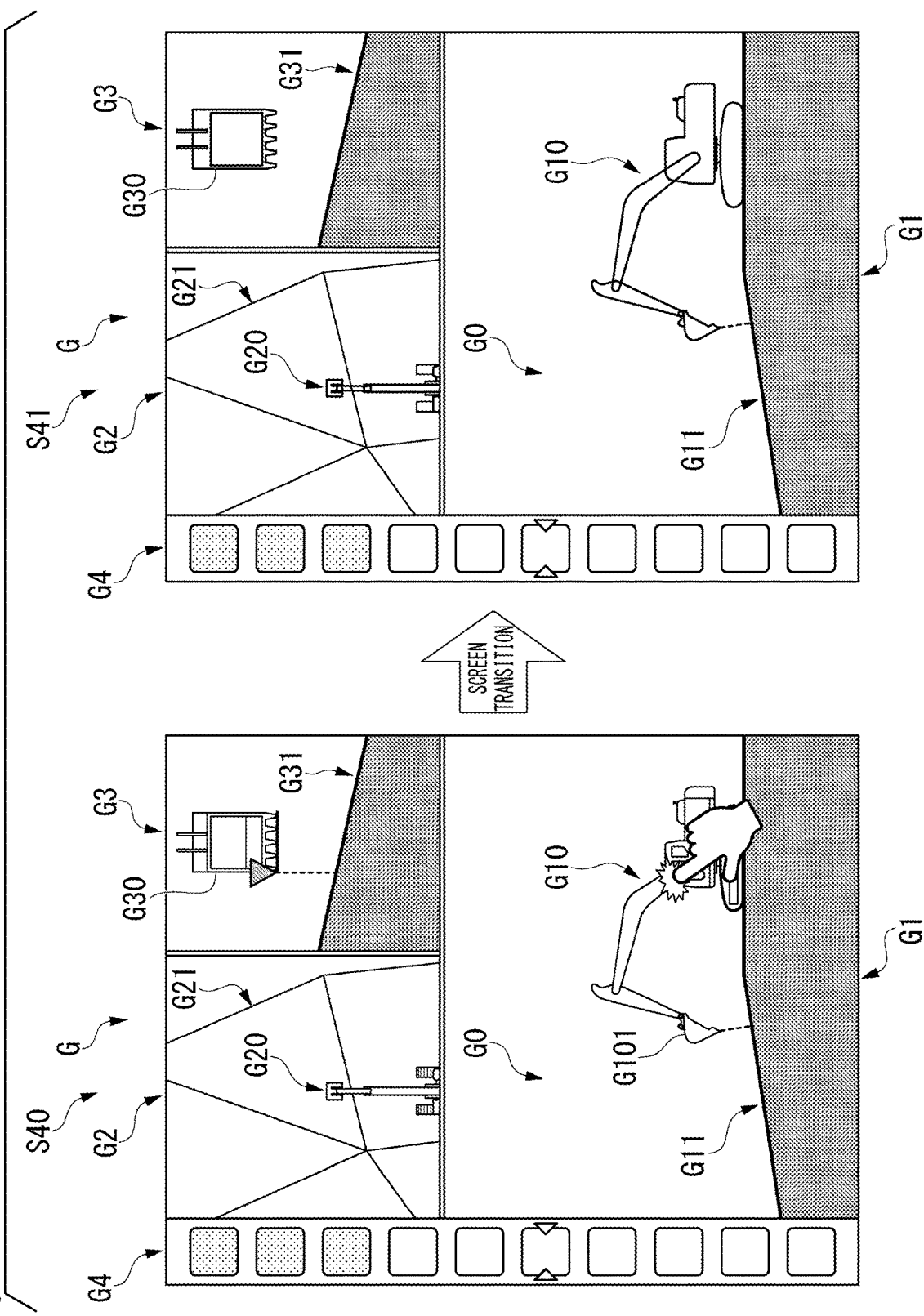
FIG. 10 is a diagram illustrating a function of the screen control unit according to the first embodiment.

FIG. 10 is a second diagram illustrating the screen control when the type of a part image is the working machine model image G10 (G20, G30).

First, it is assumed that a state image G is displayed on the display panel 22 (Step S40 in FIG. 10). The display form of the working machine model image G10 in the state image G at this time is set to "normal display." "Normal display" is a display form of the working machine model image G10 (G20, G30) for reproducing the appearance of the working machine 1.

In this state, it is assumed that an operator has touched a position which does not correspond to any constituent part in the working machine model image G10 included in the side view image G1. In this case, the screen control unit 203 changes the display form of the working machine model image G10 (G20, G30) (Step S41 in FIG. 10). In the example illustrated in FIG. 10, the display form of the working machine model image G10 (G20, G30) is switched from "normal display" to "transparent display." "Normal display" is a display form of the working machine model image G10 (G20, G30) representing the appearance of the working machine 1. "Transparent display" is, for example, skeleton display or semitransparent display.

As described above, when the type of the touched part image is the working machine model image G10, the screen control unit 203 changes the display form of the working machine model image G10 (G20, G30).

Accordingly, the operator can change the display form of the working machine model image G10 (G20, G30) with a simple and intuitive operation.

Subsequent to Step S41 in FIG. 10, when a touch on the working machine model image G10 is received again from the operator, the screen control unit 203 may return the display form of the working machine model image G10 (G20, G30) to "normal display" or change "skeleton display" to "semitransparent display" when "transparent display" is "skeleton display" (change "semitransparent display" to "skeleton display" when "transparent display" is "semitransparent display").

In another embodiment, when a touch on the working machine model image G10 is received, the screen control unit 203 may transition to a menu screen in which one out of candidates for the display form (such as "normal display" or "skeleton display") of the working machine model image G10 (G20, G30) can be selected.

In Step S40 in FIG. 10, the screen control unit 203 may also perform the same process when a touch on the working machine model image G20 included in the overhead view image G2 or the working machine model image G30 included in the bucket front view image G3 has been received.

In another embodiment, the screen control unit 203 may display an engine or another constituent part in the working machine at the time of "transparent display." In this case, the screen control unit 203 may display an information table indicating various types of information on the engine or the like when a touch on a part image corresponding to the displayed engine part has been received.

Background Image

Figure 11:
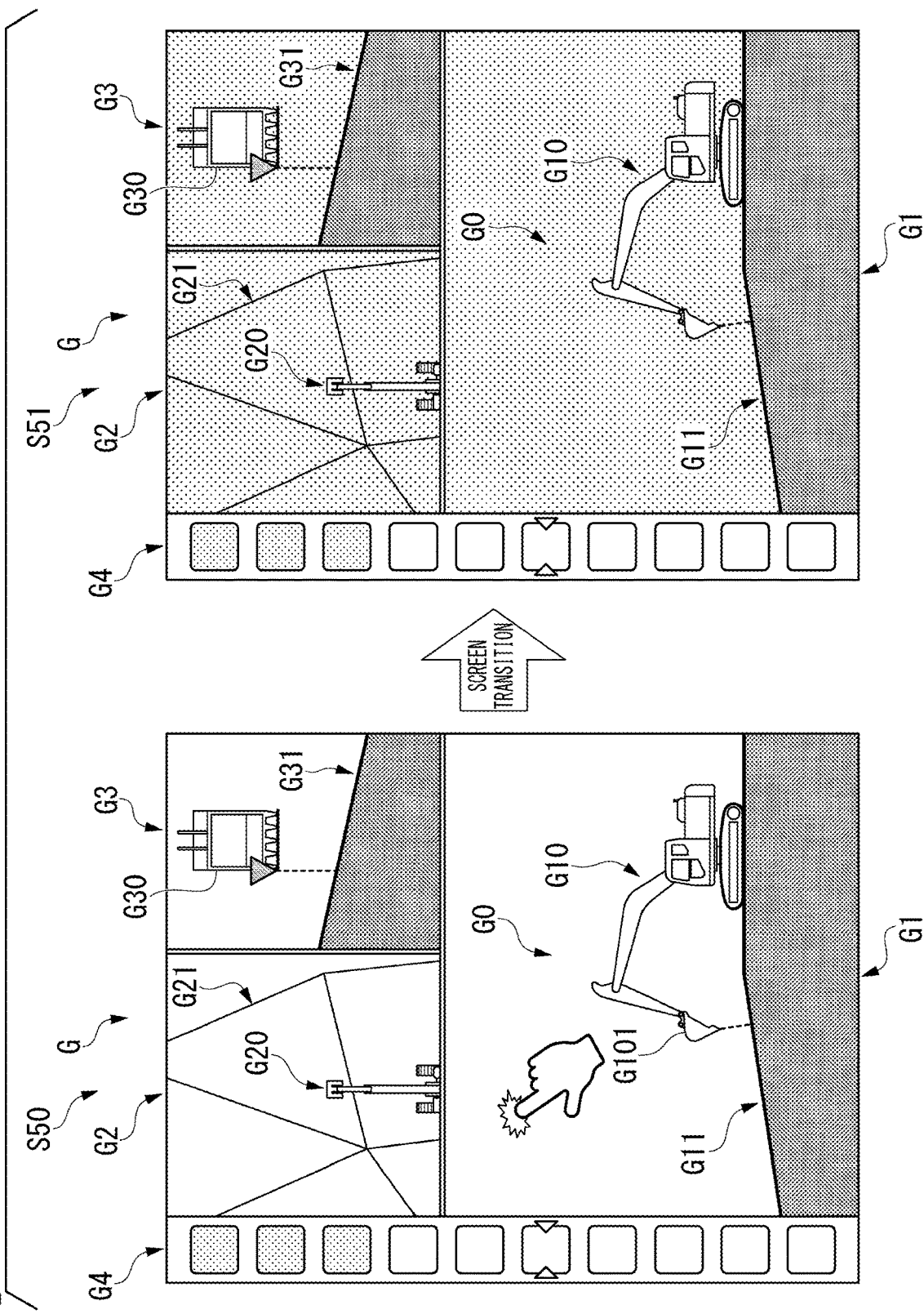
FIG. 11 is a diagram illustrating a function of the screen control unit according to the first embodiment.

FIG. 11 is a diagram illustrating screen control when the type of a part image is the background image G0 of the state image G.

First, it is assumed that a state image G is displayed on the display panel 22 (Step S50 in FIG. 11). For example, it is assumed that the color of the background image G0 of the state image G is set to a standard set color such as "white."

In this state, it is assumed that an operator has touched the background image G0 of the state image G. In this case, the screen control unit 203 changes the color of the background image G0 (Step S51 in FIG. 11). Accordingly, the color of the background image G0 of the state image G is switched from the standard set color (white) to another set color such as "blue."

As described above, when the type of the touched part image is the background image G0, the screen control unit 203 changes the color of the background image G0.

Accordingly, the operator can change the color of the background image G0 with a simple and intuitive operation.

Subsequent to Step S51 in FIG. 11, when a touch on the background image G0 is received again from the operator, the screen control unit 203 may return the display form of the background image G0 to the standard set color or change the color to another color.

In another embodiment, when a touch on the background image G0 has been received, the screen control unit 203 may cause the current screen to transition to a menu screen in which one out of color candidates of the background art G0 can be selected.

In another embodiment, when a touch on the background image G0 has been received, the screen control unit 203 may cause the current screen to transition to a layout setting screen of the state image G. Here, for example, in FIG. 5, the display area of the side view image G1 is defined as "Main," the display area of the overhead view image G2 is defined as "Sub 1," and the display area of the bucket front view image G3 is defined as "Sub 2." In the layout setting screen, types of display images which are displayed for "Main," "Sub 1," and "Sub 2" can be assigned as desired by an operator. For example, an operator may perform assignment such that the overhead view image G2 is displayed in the display area of "Main" and the side view image G1 is displayed in the display area of "Sub 1."

(Operations, Advantages)

As described above, with the control device 2 according to the first embodiment, an operator can perform screen control according to a touched part image by directly touching the state image G. Accordingly, it is possible to change settings with a very simple and intuitive operation.

For example, a solution that a shortcut icon is provided in a top screen is also conceivable. However, in general, a display panel of the control device 2 which is mounted in a cab of a working machine has a small size and an amount of information which can be displayed on one screen is limited. In these circumstances, when a dedicated shortcut icon is provided in the top screen, an amount of information which can be displayed on one screen is further limited.

With the control device 2 according to this embodiment, since a dedicated shortcut icon or the like may not be provided in the state image G, an amount of information which can be displayed on one screen may not be reduced.

That is, with the control device, it is possible to change settings with a simple operation without limiting an amount of information which can be displayed on one screen.

<Second Embodiment>

A control device according to a second embodiment will be described below in detail with reference to FIGS. 12 and 13.

(Example of State Image)

Figure 12:
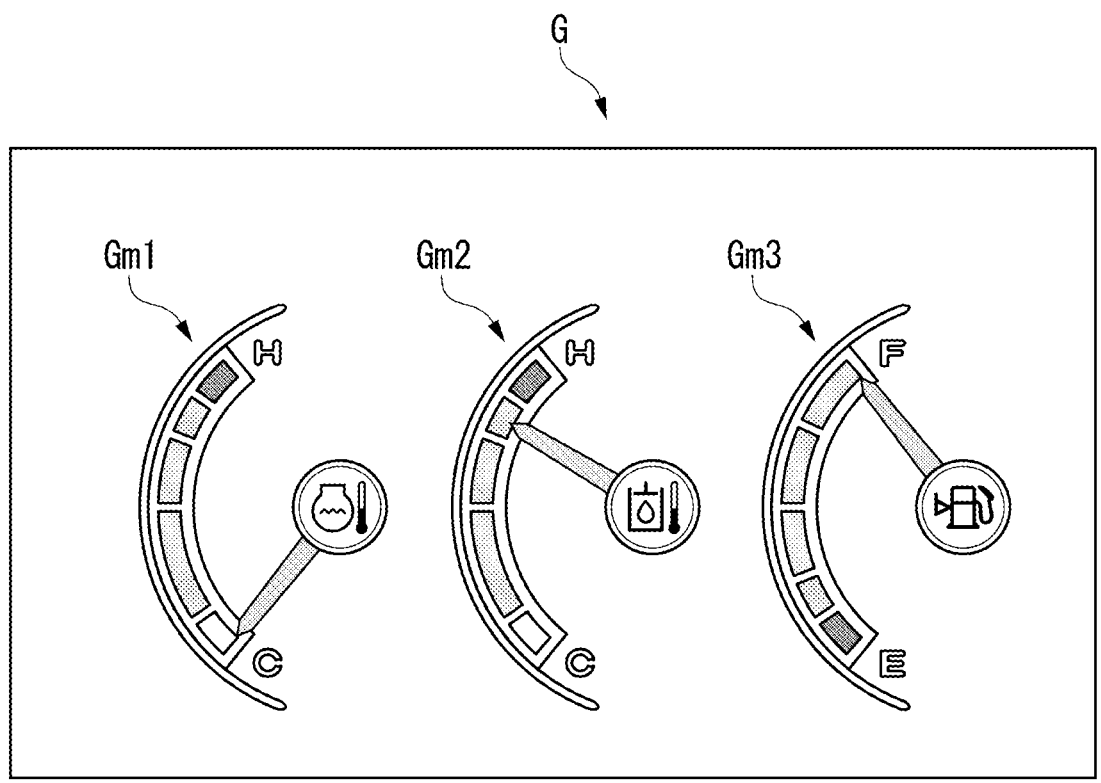
FIG. 12 is a diagram illustrating an example of a state image according to a second embodiment.

FIG. 12 is a diagram illustrating an example of a state image according to the second embodiment.

A state image G illustrated in FIG. 12 is an image including various gauge images Gm1, Gm2, and Gm3 indicating an internal state of the working machine 1. Specifically, the gauge image Gm1 is a gauge image indicating an engine coolant temperature. The gauge image Gm2 is a gauge image indicating a hydraulic oil temperature. The gauge image Gm3 is a gauge image indicating an amount of remaining fuel. The state image G may be an image including at least one of the gauge images Gm1, Gm2, and Gm3. The gauge images may include another gauge image indicating the internal state of the working machine 1 such as a gauge image indicating a vehicle speed or a loading capacity.

When a touch on the state image G illustrated in FIG. 12 is received from an operator, the screen control unit 203 according to the second embodiment performs screen control on one of the gauge images Gm1, Gm2, and Gm3 displayed at the touched position.

(Function of Screen Control Unit)

Figure 13:
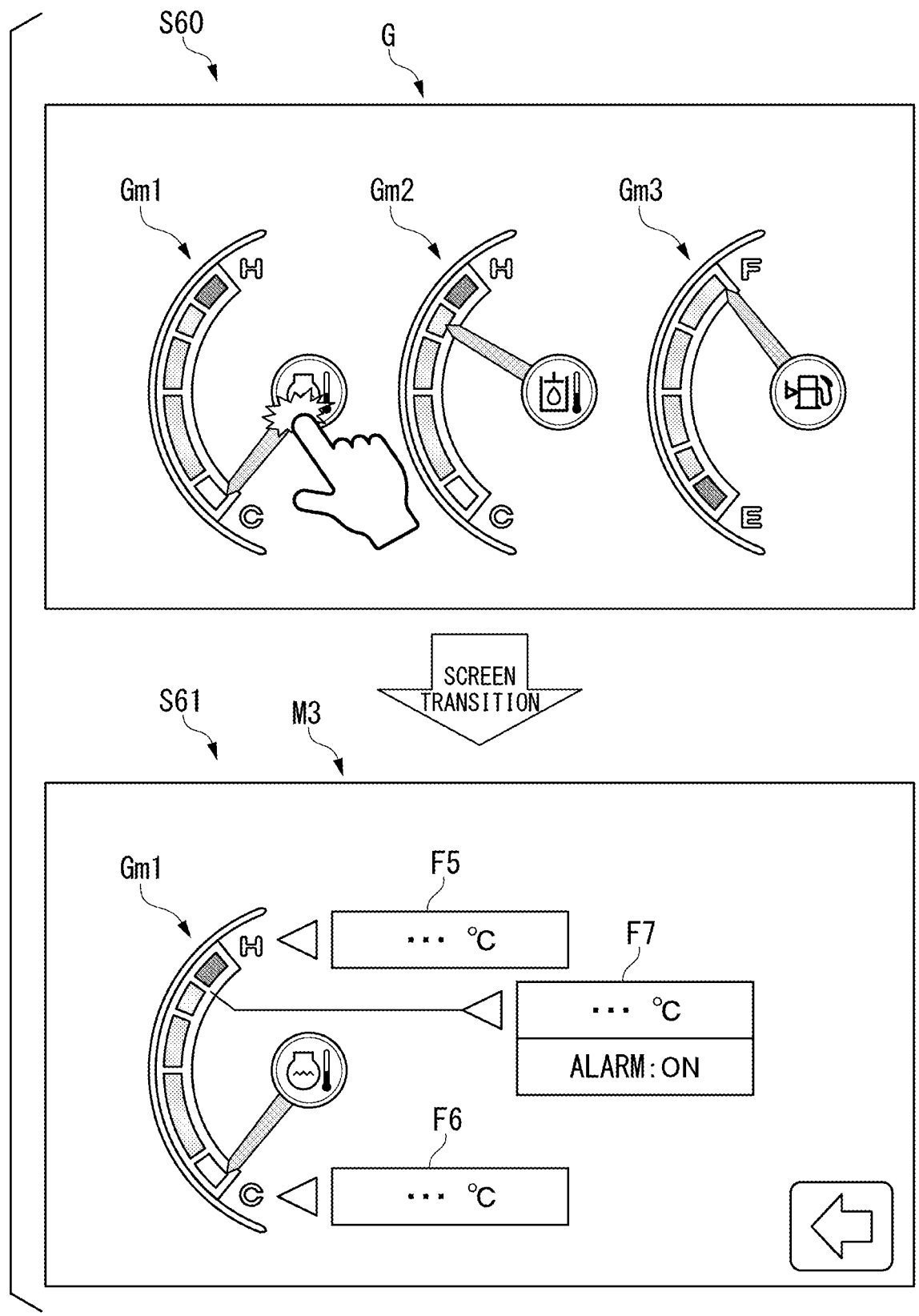
FIG. 13 is a diagram illustrating a function of a screen control unit according to the second embodiment.

FIG. 13 is a diagram illustrating the function of the screen control unit according to the second embodiment.

FIG. 13 is a diagram illustrating screen control when the type of a touched part image is the gauge image Gm1.

First, it is assumed that a state image G is displayed on the display panel G22 (Step S60 in FIG. 13).

In this state, it is assumed that an operator has touched the gauge image Gm1. In this case, the screen control unit 203 causes the image displayed on the display panel 22 from the state image G to the coolant gauge setting menu image M3 (Step S61 in FIG. 13). Specifically, the coolant gauge setting menu image M3 is linked to a screen of a transition destination and the screen control unit 203 performs transition to the coolant gauge setting menu image M3 which is a link destination of the gauge image Gm1 when the coolant gauge setting menu image M3 is identified by the type identifying unit 202. In the coolant gauge setting menu image M3, settings of an upper limit and a lower limit of a coolant temperature and an alarm set value which are displayed in the gauge Gm1 can be changed using input forms F5 to F7.

Similarly, when a touch on another gauge image Gm2 or Gm3 is received, the screen control unit 203 causes the image displayed on the display panel 22 to a setting menu image corresponding to the gauge image Gm2 or Gm3.

As described above, when the type of a touched part image is a gauge image indicating the internal state of the working machine 1, the screen control unit 203 changes display settings for the gauge images Gm1, Gm2, and Gm3.

(Modified Examples)

While the control devices 2 according to the first and second embodiments have been described above in detail, the specific configurations of the control device 2 are not limited to the above description and can be subjected to various changes in design without departing from the gist thereof.

For example, the control device 2 according to the first embodiment performs screen control on all the part images of the attachment image G101, the guidance image G4, the working machine model image G10, and the background image G0 by touching the corresponding part image, but another embodiment is not limited thereto.

That is, the control device 2 according to another embodiment may perform the aforementioned screen control on at least one of the attachment image G101, the guidance image G4, the working machine model image G10, and the background image G0.

The control devices 2 according to the first and second embodiments perform various types of screen control in response to a normal touch on the state image G, but another embodiment is not limited to the aforementioned description.

For example, the control device 2 according to another embodiment may receive designation other than tapping, such as double tapping, long pressing, and swiping on the state image G. In this case, for example, different processes may be assigned depending on the operation types as follows:

Tapping: transition to attachment selection menu

Double tapping: transition to dimension information.

The control devices 2 according to the first and second embodiments employ the attachment image G101, the guidance image G4, the working machine model image G10, the background image G0, the gauge image Gm1, the gauge image Gm2, and the gauge image Gm3 as part images, but another embodiment may not be limited thereto.

That is, the control device 2 according to another embodiment may employ, for example, images constituting the working machine such as a boom, an arm, an upper swing body, an undercarriage, an engine, a hydraulic oil filter, and a monitoring device as part images. In this case, when an image constituting the working machine is touched, transition to a screen correlated with the image constituting the working machine may be performed.

Landform images such as a landform image G11, a landform image G21, and a landform image G31 may be employed as part images. In this case, when a landform image is touched, transition to a screen for displaying information on a landform or a screen for displaying construction information may be performed.

The control devices 2 according to the first and second embodiments identify a type of a touched part image, but another embodiment may not be limited thereto.

That is, when types of part images do not need to be identified such as when only one type of part image is displayed on the display panel 22, the control device 2 according to another embodiment may skip the process of identifying the type of a part image. That is, the process of Step S02 in FIG. 4 may not be performed.

Screens which are transition destinations or settings may be linked to correspond to predetermined images or pixels displayed on the display panel 22, a touched position may be identified by the position designation receiving unit 201, and transition to a screen which is a link destination of the image or the pixel displayed at the identified touched position or display of a screen after settings have been changed may be displayed. In this case, the process of identifying the type of a part image may be skipped.

Screens which are transition destinations or settings may be linked to correspond to predetermined coordinate positions displayed on the display panel 22, a touched position may be identified by the position designation receiving unit 201, and transition to a screen which is a link destination corresponding to the identified touched position or display of a screen after settings have been changed may be displayed. In this case, the process of identifying the type of a part image can also be skipped.

Screens which are transition destinations or settings may be linked to correspond to combinations of a displayed screen type and a predetermined coordinate position on the display panel 22, a touched position may be identified by the position designation receiving unit 201, and transition to a screen which is a link destination corresponding to the identified touched position or display of a screen after settings have been changed may be displayed. In this case, the process of identifying the type of a part image can also be skipped and transition of a screen can be finely controlled.

When the method in which the process of identifying the type of a part image is skipped is employed by the control devices 2 according to the first and second embodiments and, for example, a bucket part displayed on the display panel 22 is touched, transition to the attachment selection menu image M1 can be performed. When a guidance part displayed on the display panel 22 is touched, transition to the guidance setting menu image M2 can be performed.

The control devices 2 according to the first and second embodiments are mounted in working machines 1, but another embodiment may not be limited to this configuration.

For example, a control device 2 according to another embodiment may be a terminal device that is provided outside the working machine 1 and remotely monitors the state of the working machine 1. The functional configuration of the control device 2 may be divisionally mounted in the working machine 1 and the external terminal device.

The control device 2 may be a monitor device for a remote controller or may be a smartphone or a tablet terminal which is carried by a service man or a manager of the working machine 1.

The working machine 1 in which the control device 2 according to the first or second embodiment is a hydraulic excavator, but another embodiment may not be limited to this configuration.

The control device 2 can be applied to various working machines such as a wheel loader and a dump truck in addition to the hydraulic excavator.

A control device 2 according to another embodiment may have the following functions. For example, when a crawler of the working machine model image G10 is touched in FIG. 6, the control device 2 may perform transition to a screen for setting a travel mode such as Hi (a high-speed mode) or L (a low-speed mode). The control device 2 may alternately change display of the design surface and display of the current landform when the design surface is touched. The control device 2 may perform transition to a screen for setting a teeth position of interest when a touch on the teeth of the working machine model image G30 is received.

A screen control unit 203 according to another embodiment may perform a process of changing a display form whenever a touch on a display area of an SMR, a time, or the like is received in addition to the functions described above in the second embodiment.

When a touch is received, the screen control unit 203 according to another embodiment may perform transition to a permission screen. In the permission screen, for example, whether screen transition to a bucket exchange screen or screen change for change in size of the bucket, change in color of the background, or the like is actually accepted (YES/NO) is received. Accordingly, return to a previous screen can be immediately performed when an erroneous touch occurs and thus it is possible to enhance convenience.

The processes which are performed by the control device 2 are stored in the form of a program in a computer-readable recording medium, and the processes are performed by causing a computer to read and execute the program. Examples of the computer-readable recording medium include a magnetic disk, a magneto-optical disc, a CD-ROM, a DVD-ROM, and a semiconductor memory. The computer program may be transmitted to a computer via a communication line and the computer having received the program may execute the program.

The program may be provided for realizing some of the above-mentioned functions. The program may be a program which can be realized in combination with a program which is recorded in a computer system in advance, that is, a so-called differential file or differential program.

While some embodiments of the invention have been described above, these embodiments are merely presented as examples and are not intended to limit the scope of the invention. The embodiments can be modified in various forms and can be subjected to various omissions, replacements, and changes without departing from the gist of the invention. The embodiments and modifications thereof belong to a scope equivalent to the invention described in the appended claims as well as the scope or the gist of the invention.

Industrial Applicability

According to the aforementioned aspects of the invention, it is possible to change settings with a simple operation.

The invention claimed is:

1. A control device for a working machine, the control device comprising a processor configured to:
   identify a position in a state image indicating a working machine state, the state image being displayed on a display panel; and
   perform screen control based on a type of a part image displayed at the identified position, the part image being a part of the state image,
   wherein the processor is further configured to:
      perform the screen control based on the type of the part image corresponding to a working machine model image that indicates an operating state of the working machine, and
      based on the type of the part image corresponding to an attachment image that indicates a state of an attachment of the working machine, perform transition to an attachment selection menu image that is linked to the attachment image for receiving selection of the attachment of the working machine.

2. The control device according to claim 1, wherein the processor is further configured to identify the type of the part image displayed at the identified position.

3. The control device according to claim 2, wherein the processor is configured to perform transition to a screen for receiving a change of display settings of a positional relationship between the working machine and a nearby landform based on the type of the part image corresponding to a guidance image indicating the positional relationship.

4. The control device according to claim 2, wherein the processor is configured to change display settings of a positional relationship between the working machine and a nearby landform based on the type of the part image corresponding to a guidance image indicating the positional relationship.

5. The control device according to claim 2, wherein the processor is configured to, based on the type of the part image corresponding to a gauge image indicating an internal state of the working machine, change display settings of the gauge image.

6. The control device according to claim 1, wherein the processor is configured to change display settings of information on a constituent part corresponding to the position in the working machine model image based on the type of the part image corresponding to the working machine model image.

7. The control device according to claim 1, wherein the processor is configured to change a display form of the working machine model image based on the type of the part image corresponding to the working machine model image.

8. A working machine comprising the control device according to claim 1.

9. A control device for a working machine, the control device comprising a processor configured to:

identify a position in a state image indicating a working machine state, the state image being displayed on a display panel;

perform screen control based on the identified position; and identify a type of a part image displayed at the identified position, wherein the processor is further configured to:

perform the screen control based on the part image constituting a working machine model image when the type of the part image is the working machine model image indicating an operating state of the working machine, and change an attachment image which is currently displayed to another attachment image when the type of the part image is the attachment image indicating a state of an attachment of the working machine.

10. A control method for a working machine, the method comprising:

identifying a position in a state image displayed on a display panel;

performing screen control based on a type of a part image displayed at the identified position, the part image being a part of the state image;

performing the screen control based on the type of the part image corresponding to a working machine model image that indicates an operating state of the working machine; and based on the type of the part image corresponding to an attachment image that indicates a state of an attachment of the working machine, performing transition to an attachment selection menu image that is linked to the attachment image for receiving selection of the attachment of the working machine.

* * * * *